March 25, 1930. F. E. RADABAUGH 1,751,947
LICENCE PLATE HOLDER
Filed May 4, 1927
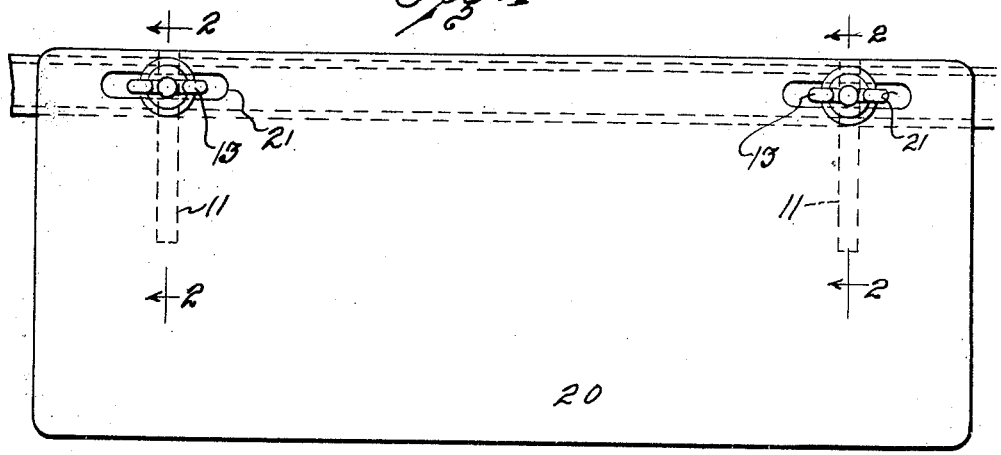
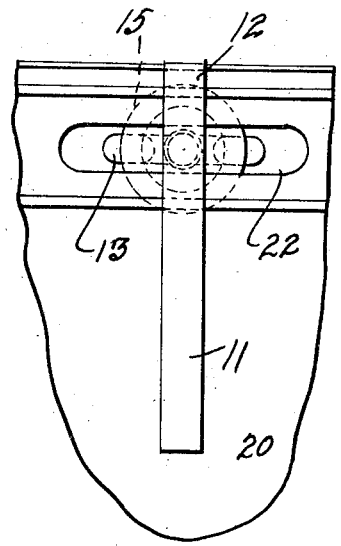
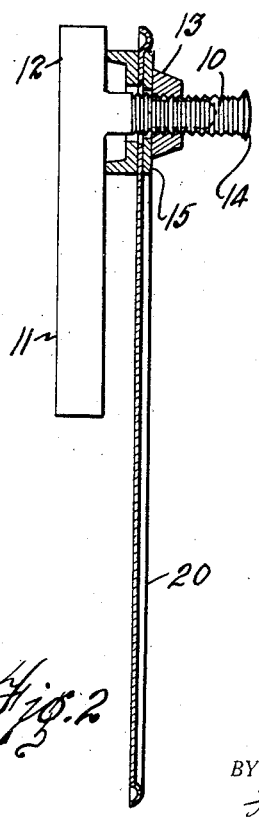
INVENTOR.
Lloyd E. Radabaugh
BY Francis D. Hardesty
ATTORNEY.

Patented Mar. 25, 1930

1,751,947

UNITED STATES PATENT OFFICE

FLOYD E. RADABAUGH, OF PLEASANT RIDGE, MICHIGAN

LICENSE-PLATE HOLDER

Application filed May 4, 1927. Serial No. 188,630.

The present invention relates to means for securing license tags or plates to the brackets or other members provided therefor on automobiles.

Among the objects of the invention is a device which shall be simple, cheap and effective for the purpose mentioned.

Another object is a device which will not of itself become displaced with the consequent loss of the tag or plate.

Still other objects will readily appear to those skilled in the art upon reference to the following description and accompanying drawing, in which:—

Fig. 1 is a view in elevation of a license plate with the devices in position;

Fig. 2 is a section on line 2—2 of Fig. 1;

Fig. 3 is an enlarged rear view of one of the devices in position; and

Fig. 4 is a front view thereof.

As indicated the device, of which two will be used for each plate, consists of a bolt 10 provided with a T-head of which one end 11 is considerably longer than the other 12. The bolt 10 is provided with a nut 13, preferably a wing nut as shown, and the bolt end riveted over as at 14 to prevent removal or loss of the nut. If desired, a washer 15 may also be placed on the bolt before riveting and this may be either a plain washer or a back washer or both can be used.

The usual license plate, indicated at 20, is provided with slots 21 as is also the usual bracket or support as indicated at 22, and such slots permit the ready insertion and removal of the T-head. When the device is inserted, the end 11 is turned downward and the nut 13 tightened against the front of the plate. End 11 is designed to be of sufficiently greater length, and therefore weight, than end 12 to cause it to hang down even if the nut 13 should become accidently loosened. The device cannot therefore become displaced as the nut 13 cannot pass the end 14 of the bolt and the plate 20 cannot therefore become lost.

Now having described the invention and the preferred form of embodiment thereof it is to be understood that the same is to be limited not to the specific details herein set forth but only by the scope of the claim which follows.

I claim:—

A license plate securing device comprising a bolt, a nut thereon, means to prevent removal of the nut from the bolt, and an integral T-head for said bolt having one end of the cross member of greater length and weight than the other.

FLOYD E. RADABAUGH.